(No Model.)
I. D. WEAVER.
RATCHET DRILL.
No. 329,790. Patented Nov. 3, 1885.
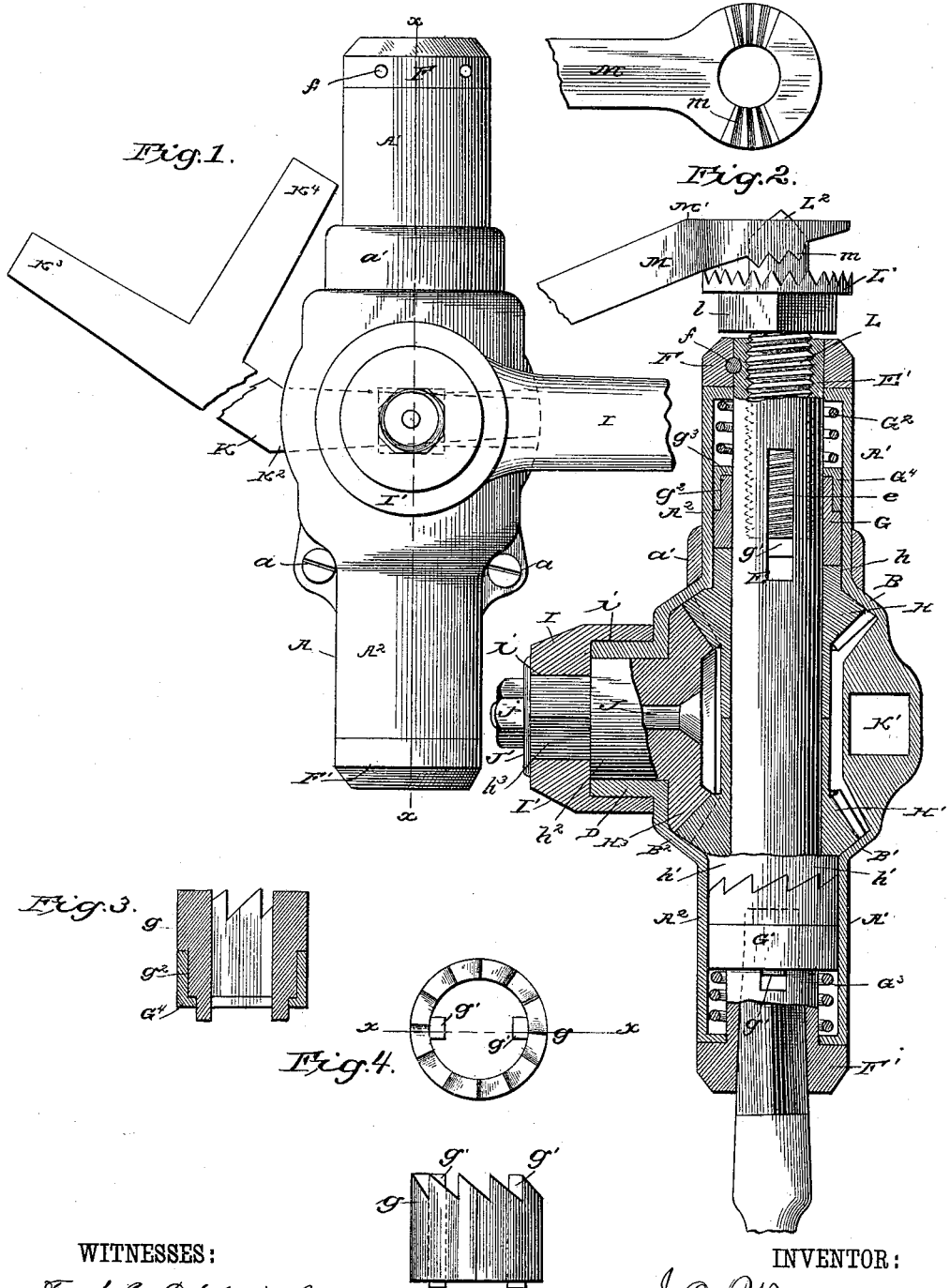
WITNESSES:
Fred. G. Dieterich
P. B. Turpin
INVENTOR:
I. D. Weaver
BY Munn & Co.
ATTORNEYS.

UNITED STATES PATENT OFFICE.

ISAAC D. WEAVER, OF LEBANON, PENNSYLVANIA, ASSIGNOR, BY DIRECT AND MESNE ASSIGNMENTS, TO HIMSELF, CHARLES BOWMAN, AND ELDRIDGE H. BROOKS, ALL OF SAME PLACE.

RATCHET-DRILL.

SPECIFICATION forming part of Letters Patent No. 329,790, dated November 3, 1885.

Application filed August 3, 1885. Serial No. 173,480. (No model.)

*To all whom it may concern:*

Be it known that I, ISAAC D. WEAVER, a citizen of the United States, residing at Lebanon, in the county of Lebanon and State of Pennsylvania, have invented a new and useful Improvement in Ratchet-Drills, of which the following is a description.

This invention is an improvement in ratchet-drills, and has for an object to provide a drill which will be simple in construction and efficient in use.

The invention consists in certain novel constructions and combinations of parts, as will be hereinafter described, and pointed out in the claims.

In the drawings, Figure 1 is a side view of the wrench. Fig. 2 is a longitudinal section on line $x\ x$, Fig. 1. Figs. 3 and 4 are detail views of the ratchet-sleeves.

The casing A is made, preferably, in two longitudinal sections, A' A², bolted or riveted together at $a\ a$ on one side of their bearing portion, and having a strengthening-ring, $a'$, fitted around them above said bearing portion. The casing is enlarged at the bearing portion, forming shoulders B, B', and B². On the section A', I form a lateral hub, D, which furnishes a long bearing for the operating-lever. The drill-shaft E is journaled in the casing, and is held from longitudinal movement therethrough by a collar, F, fixed to the shaft, preferably by a pin, $f$, as shown, at one end, and a fixed collar or shoulder, F', at the other end. This shaft has a suitable socket in its lower end to receive the drill proper, and it is provided in its upper end with a threaded bore or socket, E', for the feed-screw. On each side of the bearing portion of the casing the shaft is provided with slots $e\ e$ for the keys of the clutch-sections. Each clutch G G' has ratchet-teeth at one end, and is divided longitudinally into segmental sections $g\ g$, and both sections have keys $g'\ g'$ fitting into the slots $e\ e$ of the shaft, and made shorter than said slots. By this construction, it will be seen, the clutches have a limited movement longitudinally of the shaft, but are held from any rotary movement thereon by the keys $g'\ g'$. Springs G² G³ bear between the clutches G G' and the adjacent ends of the casing. In order to provide a better bearing for such springs and to prevent them from bearing unequally upon the said sections, the latter are by preference formed with annular grooves $g^2$ at their outer ends opposite the ratchet-teeth. In these grooves I place sleeves G⁴, having flanges $g^3$, which project over the ends of the clutching-sections and furnish continuous bearings for the springs G² G³. Bevel-gears H H' are journaled on the shaft and rest against the bearings B B'. These gears have hubs $h\ h'$, the ends of which are ratcheted to engage the teeth of clutches G G'. The drive-gear H³ rests against the bearing B². This gear meshes with both H H', and it has a long hub, $h^2$, which bears within the hub D of the casing, and the end of such hub $h^2$ is extended beyond the hub D, and formed with an angular portion, $h^3$, to receive the operating-lever.

I form the operating-lever I with a head, I', having a circular opening, $i$, to fit on the hub D, and an angular opening, $i'$, to fit the part $h^2$ of the wheel H³. This wheel and the operating-lever are held in place by the bolt J, which passes through the hub, and is secured by the nut $j$, turning against a washer-plate, J', as most clearly shown in Fig. 2. By the described construction, it will be seen, strong bearings are provided for the operating lever and gear, and great force may be applied thereto without danger of breaking the parts.

As the lever is worked it gives the drive-gear an oscillating motion, which it transmits to the gears H H'. One of these gears operates the drill-shaft through the medium of its clutch when revolved in one direction and the other when revolved in the other direction, as will be seen, so that a continuous rotary motion is given the shaft by the reciprocating movement of the lever. On the opposite side of the casing from the bearing-hub D, I form an angular socket or opening, K', for the stop K. This stop is provided with points K² K³ K⁴, arranged at different angles to each other, and fitted to be inserted in the socket K' from either side thereof. By this arrangement and the different angles of the stop, such stop may be adjusted to project in opposite directions from the casing in order to engage the work being drilled or any other convenient fixed object, to prevent the casing from revolving. The angular socket permits each point to be placed therein in a variety of ways, so that the stop may project up, down, or to either side. The feed-screw L is threaded into the socket of the drill-shaft, and is provided with a toothed wheel or disk, L′, having an angular portion, $l$, fitted to receive a wrench, and a bearing point, L², projected above said disk and adapted to journal against a suitable back stop or support in the operation of the machine. On the point L² is placed a lever, M, having teeth $m$ adapted to engage those of the disk L′. This lever is termed the "feed-lever," and it has its upper edge formed with a point, M′, which acts as a fulcrum when the outer end of the lever is elevated, and by binding against the back bearing moves the teeth into engagement with the teeth of the feed-screw wheel, and by stopping such screw causes the drill-shaft as it is revolved to feed down thereon. When the lever is released, the screw revolves with the shaft, and the feeding ceases.

I claim—

1. In combination with a shaft having a slot, $e$, and a gear placed on said shaft and having a ratcheted hub or end, a clutch having a key fitted to said slot $e$, and divided longitudinally into segmental sections, substantially as set forth.

2. The combination, with the drill-shaft having a threaded socket, and the screw threaded into said socket, and having a toothed wheel and a bearing-point, of the feed-lever fitted over said bearing-point, and having teeth adapted to engage the wheel of the feed-screw, said lever being provided with a fulcrum-point, substantially as set forth.

3. The combination of the drill-shaft having slots, the clutch divided longitudinally into segmental sections, each provided with a key fitting into said slot, the spring engaging said clutch, and the gearing connecting the same with the drive-gear, substantially as set forth.

4. In a ratchet-drill, the combination of the casing, the slotted drill-shaft, the clutches made in longitudinal sections, having their outer ends grooved and provided with keys fitting the slots of the shaft, the bearing-sleeves fitting into the grooves of the sections and having flanges fitting over the ends of same, the springs bearing between said sleeves and the casing, the drive-gear, and the gearing between the same and the clutches, substantially as set forth.

5. The combination of the driving-gear with the drill-shaft and the casing, the latter being provided with a socket, K′, adapted to receive the stop K, with its plurality of arms arranged at different angles to each other, all operating substantially as described.

6. In a ratchet-drill having its casing provided with a socket, as K′, the stop K, having a plurality of arms arranged at different angles and adapted to be inserted in the socket K′, substantially as set forth.

ISAAC D. WEAVER.

Witnesses:
JOHN D. BROWN,
GEO. H. REMIEHL.